United States Patent
Sengoku et al.

(10) Patent No.: US 7,865,305 B2
(45) Date of Patent: Jan. 4, 2011

(54) NAVIGATION SYSTEM (75) Inventors: Koji Sengoku, Minato-ku (JP); Aiko Sugawara, Minato-ku (JP); Masakuni Tsuge, Minato-ku (JP); Masayuki Arai, Wako (JP); Yoshitaka Kinoshita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/668,226

(22) PCT Filed: Jul. 3, 2008

(86) PCT No.: PCT/JP2008/001765
§ 371 (c)(1),
(2), (4) Date: Jan. 8, 2010

(87) PCT Pub. No.: WO2009/008137
PCT Pub. Date: Jan. 15, 2009

(65) Prior Publication Data
US 2010/0179752 A1    Jul. 15, 2010

(30) Foreign Application Priority Data
Jul. 10, 2007   (JP)   ............................. 2007-181422

(51) Int. Cl.
G08G 1/137   (2006.01)
G01C 21/34   (2006.01)
(52) U.S. Cl. ....................... 701/210; 701/211
(58) Field of Classification Search ........................ None
See application file for complete search history.

(56) References Cited

U.S. PATENT DOCUMENTS 6,664,924 B2 * 12/2003 Knockeart et al. ...... 342/357.13
2002/0161519 A1 * 10/2002 Mori et al. .................. 701/210

FOREIGN PATENT DOCUMENTS

JP   6-68389    3/1994
JP   8-261782   10/1996

(Continued)

OTHER PUBLICATIONS

International Search Report for Application No. PCT/JP2008/001765, dated Oct. 7, 2008.

*Primary Examiner*—Michael J. Zanelli
(74) *Attorney, Agent, or Firm*—Lahive & Cockfield, LLP; Anthony A. Laurentano (57) ABSTRACT

A navigation server and the like capable of making a navigation device 200 output a route having adequacy in view of various circumstances is provided. A navigation server 100 recognizes a navigation route r(k) for guiding the automobile 2 to the destination position $p_2$ which is set according to the first algorithm by the navigation device 200. Further, a support route R(k) for guiding the automobile 2 from a current position (or a departure position) $p_1$ to the destination position $p_2$ which is set according to the first algorithm is recognized. Still further, a first index $c_1(k)$ representing an adequacy of the navigation route r(k) in view of the second algorithm is evaluated. On condition that the first index $c_1(k)$ satisfies a predetermined condition, the support route R(k) is output in place of the navigation route r(k) by the navigation device 200.

4 Claims, 3 Drawing Sheets

FOREIGN PATENT DOCUMENTS

| | | |
|---|---|---|
| JP | 11-51681 | 2/1999 |
| JP | 2001-141489 | 5/2001 |
| JP | 2002-318124 | 10/2002 |
| JP | 2003-14483 | 1/2003 |
| JP | 2003-195743 | 7/2003 |
| JP | 2005-163584 | 6/2005 |

* cited by examiner

NAVIGATION SYSTEM

RELATED APPLICATIONS

This application is a 35 U.S.C. 371 national stage filing of International Application No. PCT/JP2008/001765, filed Jul. 3, 2008, which claims priority to Japanese Patent Application No. 2007-181422 filed on Jul. 10, 2007 in Japan. The contents of the aforementioned applications are hereby incorporated by reference.

BACKGROUND OF THE INVENTION

1. Technical Field

The present invention relates to a navigation server and the like which supports guiding of a mobile body by a navigation device, on the basis of communication with the navigation device.

2. Description of the Related Art

Conventionally, there has been proposed a technique of making a navigation device set and output a new route to a destination position, in the case where an automobile departs from a route to the destination set by the navigation device mounted on the automobile (refer to Japanese Patent Application Laid-Open No. H06-068389 and Japanese Patent Application Laid-Open No. H08-261782).

However, there is a possibility that a route lacking adequacy in view of various circumstances such as a situation not taken into consideration at the time of route setting by the navigation device, and that the automobile is guided according to such route.

SUMMARY OF THE INVENTION

In view of the above circumstances, an object to be solved by the present invention is to provide a navigation server and the like capable of making a navigation device output a route having adequacy in view of various circumstances.

According to a first aspect of the present invention, there is provided a navigation server which supports guiding of a mobile body by a navigation device, on the basis of communication with the navigation device, comprising: a first support processing unit which recognizes a navigation route for guiding the mobile body to a destination position, which is set according to a first algorithm by the navigation device, on the basis of communication with the navigation device; a second support processing unit which recognizes a departure position and the destination position of the mobile body on the basis of communication with the navigation device, and sets a support route for guiding the mobile body from the departure position to the destination position according to a second algorithm; and a third support processing unit which evaluates a first index representing an adequacy of the navigation route recognized by the first support processing unit in view of the second algorithm, and makes the navigation device output the support route in place of the navigation route on the basis of communication with the navigation device, on condition that the first index satisfies a predetermined condition.

According to the navigation server of the first aspect of the invention, it becomes possible to make the navigation device output the support route having adequacy in view of the second algorithm, in the case where the navigation route set at the navigation device lacks adequacy in view of the second algorithm.

The navigation server of a second aspect of the invention is the navigation server of the first aspect of the invention, wherein the third support processing unit evaluates a second index representing an adequacy of the support route set by the second support processing unit in view of the second algorithm, and makes the navigation device output the support route in place of the navigation route on the basis of communication with the navigation device, on condition that the first index satisfies the predetermined condition, the predetermined condition being a condition in which a deviation between the first index and the second index exceeds a threshold value.

According to the navigation server of the second aspect of the invention, the adequacy of the navigation route and the support route in view of the second algorithm, respectively, is evaluated as the first index and the second index, respectively. Further, on the basis of the comparison result of the first index and the second index, whether or not the navigation route has adequacy is determined. Thereafter, in accordance with the determination result that the navigation route lacks adequacy, it becomes possible to make the navigation device output the support route in place of the navigation route.

The navigation server according to a third aspect of the invention is the navigation server of the first aspect of the invention, wherein the second support processing unit sets the support route according to an algorithm showing preference to short required moving time or the distance of the mobile body, good fuel consumption, low toll fare, or passing a specified point or a specified link for the mobile body, as the second algorithm.

According to the navigation server of the third aspect of the invention, it becomes possible to make the navigation device output the support route having shorter moving time or distance, better fuel consumption, lower toll fee, or higher frequency of passing the specified link, in place of the navigation route, in the case where the navigation route lacks adequacy in view of shortening the moving time or distance, improving of fuel consumption, saving of toll fee, or frequency of passing the specified link.

The navigation server according to a fourth aspect of the invention is the navigation server of the first aspect of the invention, wherein the second support processing unit sets the support route according to the second algorithm which differs from the first algorithm.

According to the navigation server of the fourth aspect of the invention, it becomes possible to avoid the situation where the support route is set according to the second algorithm which is identical to the first algorithm so that the support route is identical to the navigation route, and the comparison between the first index and the second index becomes meaningless.

According to a fifth aspect of the invention, there is provided a navigation device for guiding a mobile body on the basis of communication with a navigation server, comprising: a first processing unit which recognizes a departure position and a destination position of the mobile body, and sets and outputs a navigation route for guiding the mobile body from the departure position to the destination position on the basis of a first algorithm; and a second processing unit which makes the navigation server recognize the navigation route set by the first processing unit on the basis of communication with the navigation server, and subsequently outputs a support route in place of the navigation route, on condition that the support route set at the navigation server for guiding the mobile body from the departure position to the destination position is recognized.

According to the navigation device of the fifth aspect of the invention, it becomes possible to make the navigation server examine whether or not the navigation route set according to the first algorithm have adequacy in view of the second algorithm. Thereafter, in accordance with the examination result at the navigation server that the navigation route lacks adequacy, it becomes possible to recognize the support route, and output the support route in place of the navigation route.

The navigation device of a sixth aspect of the invention is the navigation device of the fifth aspect of the invention, wherein on condition that a current position of the mobile body departs from the navigation route or the support route being output; the first processing unit newly sets and outputs the navigation route taking the current position as a new departure position; and the second processing unit makes the navigation server recognize the navigation route newly set by the first processing unit on the basis of communication with the navigation server, and subsequently outputs the support route in place of the navigation route, on condition that the support route newly set at the navigation server for guiding the mobile body from the new departure position to the destination position is recognized.

According to the navigation device of the sixth aspect of the invention, it becomes possible to make the navigation server examine whether or not there is adequacy in the current navigation route, which is set in accordance with the departing of the position of the mobile body from the previous navigation route, in view of the second algorithm. Thereafter, it becomes possible to recognize the support route and output the support route in place of the current navigation route, in accordance with the examination result at the navigation server that the current navigation route lacks adequacy.

The navigation device of a seventh aspect of the invention is the navigation device of the sixth aspect of the invention, wherein on condition that the current position of the mobile body departs from the navigation route or the support route being output; the first processing unit sets a new navigation route including a route which connects the current position of the mobile body and a position of the navigation route exceeding a predetermined range which takes the position of the mobile body as reference.

According to the navigation device of the seventh aspect of the invention, it is possible to avoid the case where a new route which makes the mobile body join the previous navigation route at a position within the predetermined range from the mobile body is set as the current navigation route. As such, it becomes possible to avoid the situation where the mobile body is forced to make unnecessary detours or double backs, by weighing heavily on recovering the mobile body to the previous navigation route immediately.

A navigation system of an eighth aspect of the invention is configured from the navigation server according to the first aspect of the invention and the navigation device according to the fifth aspect of the invention.

According to the navigation system of the eighth aspect of the invention, it becomes possible to make the navigation device output the support route having adequacy in view of the second algorithm, in the case where the navigation route set at the navigation device lacks adequacy in view of the second algorithm.

DETAILED DESCRIPTION OF THE PREFERRED EMBODIMENTS

An embodiment of a navigation system and the like according to the present invention will now be explained below with reference to the accompanying drawings.

Figure 1:
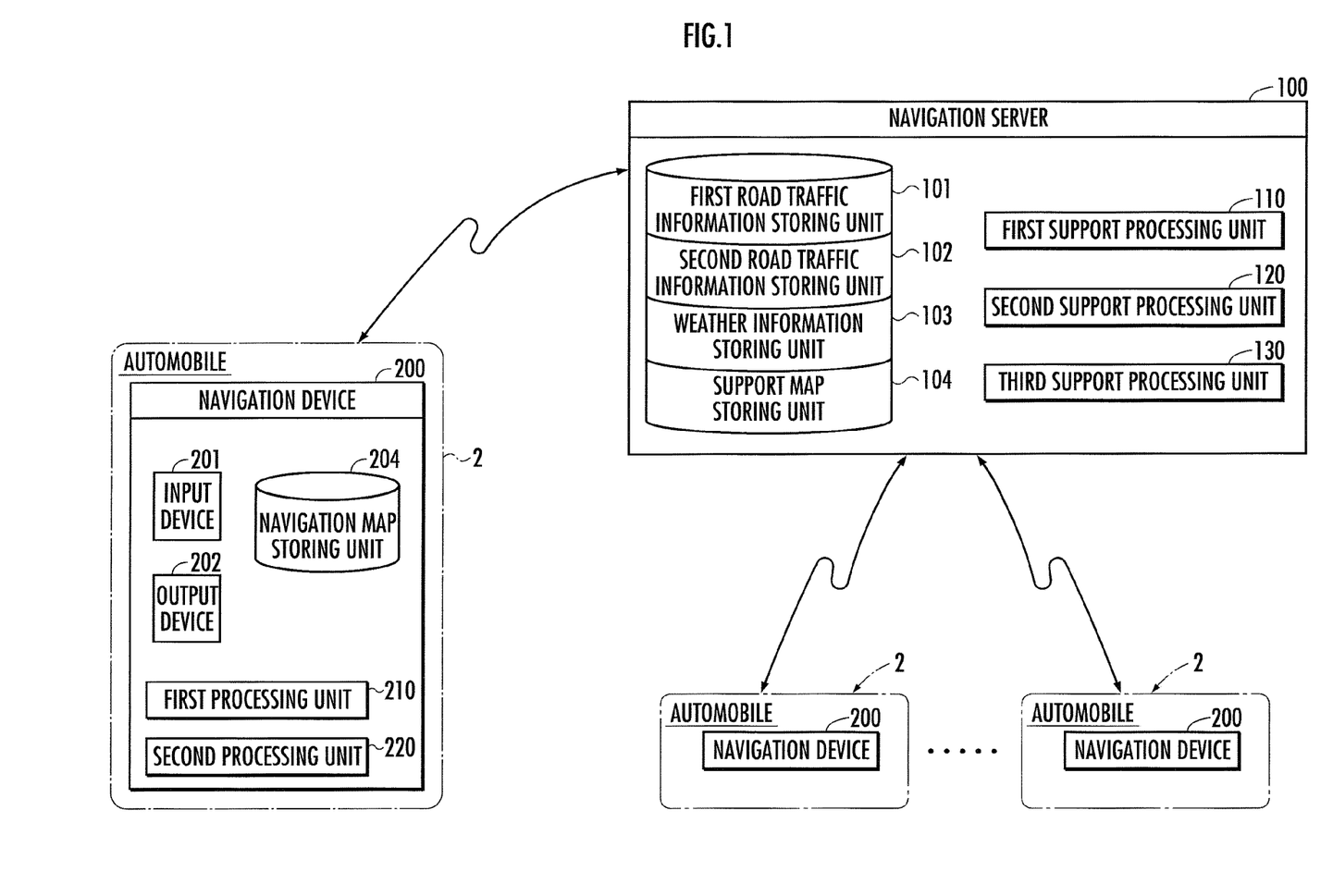
FIG. 1 is a view explaining the configuration of a navigation system according to the present invention.

The configuration of the navigation system of the present invention will be described below with reference to FIG. 1. The navigation system is configured from a navigation server 100, and a navigation device 200 mounted on an automobile 2. It should be noted that the navigation device 200 may be mounted in a mobile device other than an automobile. It is also acceptable for the navigation device 200 to be carried by a user.

The navigation server 100 is configured from one or a plurality of server computers. The navigation server 100 is equipped with a first road traffic information storing unit 101, a second road traffic information storing unit 102, a weather condition storing unit 103, a support map storing unit 104, a first support processing unit 110, a second support processing unit 120, and a third support processing unit 130.

The first road traffic information storing unit 101 is stored with a first road traffic information (required moving time, existence or not of a traffic jam and the like in individual link) based on a probe information (position of respective probe car at each time) transmitted or uploaded from the navigation device 200 mounted on the automobile 2 as a probe car or a floating car to the navigation server 100. A second road traffic information storing unit 102 is stored with a second road traffic information (required moving time, existence or nonexistence of a traffic jam and the like in individual link, and also information representing existence or nonexistence of traffic regulations in individual link, and information representing the existence or nonexistence of an event in the vicinity of individual link and the type of the event, or the like) transmitted from a road traffic information center server and the like to the navigation server 100. A weather information storing unit 103 is stored with a weather information and the like in the vicinity of individual link transmitted from a weather information center server and the like to the navigation server 100. The support map storing unit 104 is stored with a support map information. In the support map information, the location, shape and posture or the like of an individual link constituting a road are expressed by a series of coordinates ((latitude, longitude), or (latitude, longitude, altitude)). Moreover, individual link is tagged with link identifier for identifying individual link, and data representing the road type.

The first support processing unit 110 recognizes a navigation route r set by the navigation device 200 and which connects a departure position $p_1$ and a destination position $p_2$ of the automobile 2 (or a user), on the basis of communication with the navigation device 200. On the basis of the first road traffic information stored in the first road traffic information storing unit 101, the second road traffic information stored in the second road traffic information storing unit 102, the weather information and the like stored in the weather condition storing unit 103, and the support map information stored in the support map storing unit 104, the second support processing unit 120 sets a support route R which connects the departure position $p_1$ and the destination position $p_2$ according to a second algorithm. The third support processing unit 130 evaluates a first index $c_1$ which represents an adequacy of the navigation r recognized by the first support processing unit 110 in view of the second algorithm. On condition that the first index $c_1$ satisfies a predetermined condition, the third support processing unit 130 makes the navigation device 200 output the support route R in place of the navigation route r via an output device 202, on the basis of communication with the navigation device 200.

The navigation device 200 is comprised of an ECU or a computer mounted in the automobile 2 as hardware, and a navigation program which is stored in a memory and which provides the computer with various functions as software. The navigation program may be pre-installed in the memory (ROM) in the vehicular computer, or a part of or all of the navigation program may be downloaded or broadcasted from a server (not shown) via a network or a satellite to the vehicular computer to be stored in the memory (EEPROM, RAM) or the like thereof at an arbitrary timing when there is a request or the like from the vehicular computer.

The navigation device 200 is equipped with an input device 201, the output device 202, a navigation map storing unit 204, a first processing unit 210, and a second processing unit 220.

The input device 201 is comprised of operating buttons or a microphone disposed in a center console or the like of the automobile 2, and enables a user to perform various settings by operation or voice output. The output device 202 is a display device disposed in the center console of the automobile 2 for displaying or outputting navigation map information and the like. The navigation map storing unit 204 is stored with the navigation map information or the like to be output to the output device 202. In the navigation map information, the location, shape and posture or the like of an individual link constituting a road are expressed by a series of coordinates. Moreover, individual link is tagged with the link identifier for identifying individual link. Even though the definitions of the coordinates and the like in the navigation map information and the support map information are different due to the different specifications and data architectures therebetween, it is possible to match the links by tagging the identical links with common link identifier.

The first processing unit 210 recognizes a current position (or the departure position) $p_1$ of the automobile 2, and the destination position $p_2$ input to the navigation device 200 through the operation of the input device 201 by the user. The first processing unit 210 sets the navigation route r for guiding the automobile 2 from the current position $p_1$ to the destination position $p_2$, on the basis of the navigation map information stored in the navigation map storing unit 204, and the road traffic information delivered from the navigation server 100, and according to a first algorithm. Further, the first processing unit 210 makes the output device 202 output the navigation route r. The road traffic information delivered from the navigation server 100 to the navigation device 200 includes the first road traffic information prepared on the basis of data collected from the floating cars (FCD), and the second road traffic information of major highways provided from the road traffic information center (for example, the VICS center). On the basis of communication with the navigation server 100, the second processing unit 220 makes the navigation server 100 recognize the navigation route r set by the first processing unit 210, more specifically the link identifier of individual link constituting the navigation route r. Further, on the basis of communication with the navigation server 100, the second processing unit 220 makes the output device 202 output the support route R in place of the navigation route r, on condition that the support route R set at the navigation server 100 is recognized.

It should be noted that the term a component as a hardware "recognizes" information means that the component performs a possible information processing on a piece of information to prepare the piece of information ready for other information processing, for example, the component receives the piece of information; searches the piece of information in a database or memory or retrieves the piece of information from a database or memory; calculates, estimates, configures, determines, searches the piece of information or the like via arithmetic processing on the basis of the received basic information or the like; visualizes information by decoding packages; and stores in memory or the like the calculated information or the like. Further, it should also be noted that the term a component as the hardware "outputs" information means that the component outputs information in all possible forms enabling a human being recognize the same via five senses such as visual perception, auditory perception, tactile perception and the like, for example, the component displays, auditory outputs, vibratory outputs the information and the like.

The function of the navigation system with the above-mentioned configuration will be explained below.

Figure 2:
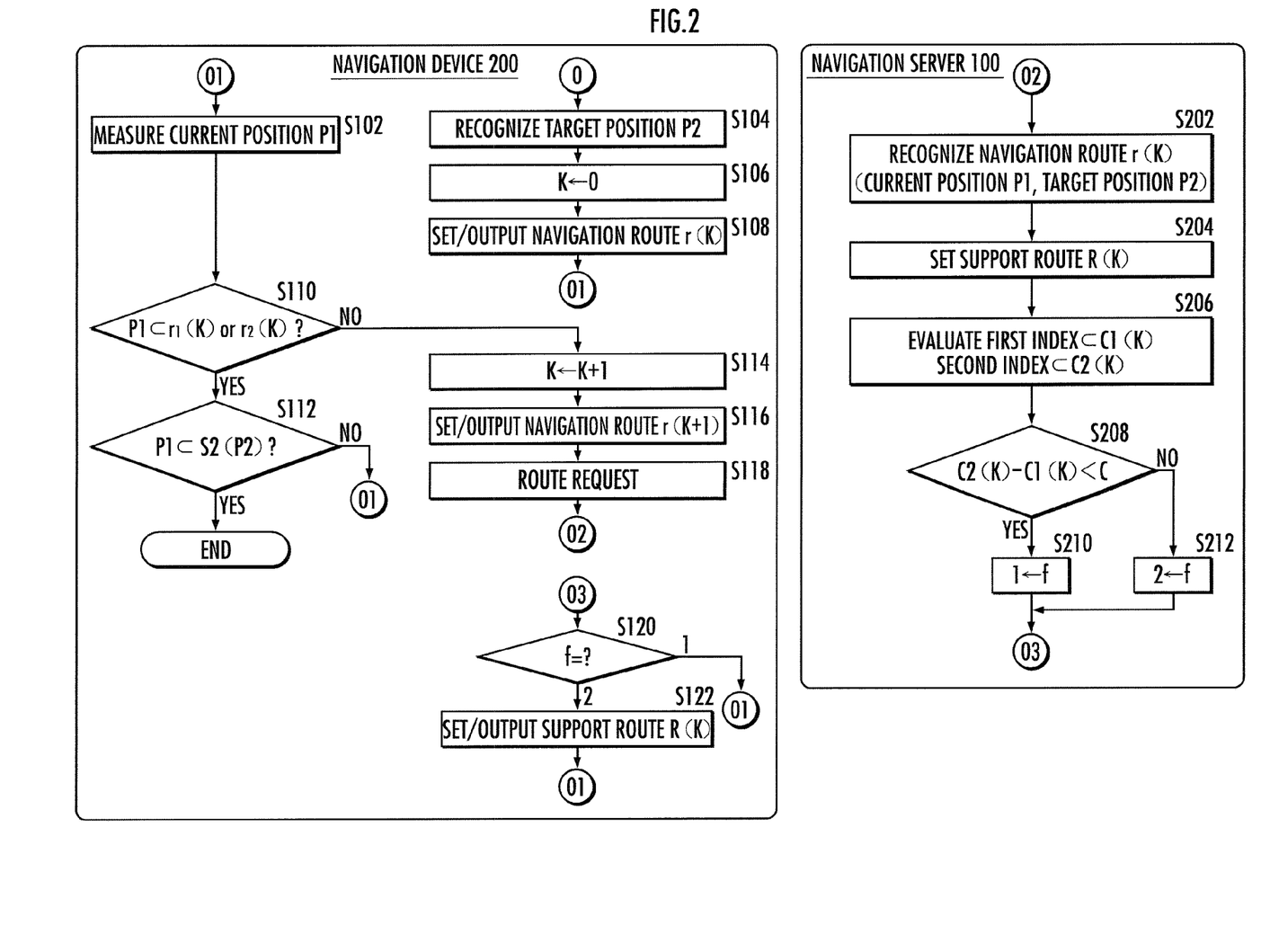
FIG. 2 is a view explaining the function of the navigation system according to the present invention.
Figure 3:
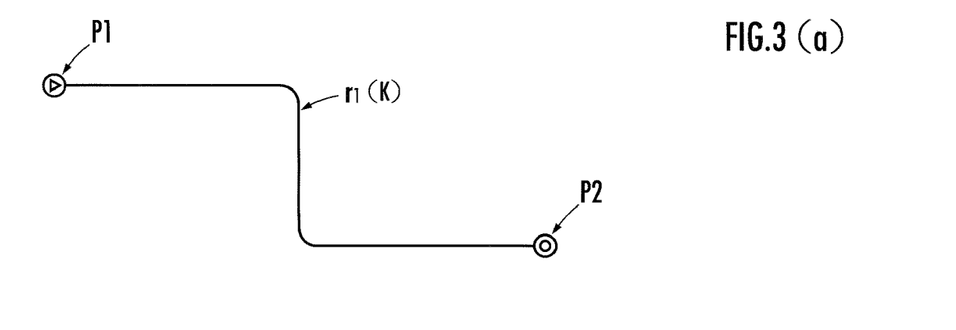
FIG. 3 is a view explaining an output screen in a navigation device of the present invention.

The current position $p_1$ of the automobile 2 is measured by the first processing unit 210, by utilizing the GPS function or the gyro sensor mounted on the automobile 2 (FIG. 2/S102). The destination position $p_2$ of the automobile 2 is recognized by the first processing unit 210, by recognizing the operation state of the buttons attached to the navigation device 200 by the user, or recognizing sound of the utterance of the user (FIG. 2/S104). Further, the first processing unit 210 initializes an index k which represents an order of an output route to "0" (FIG. 2/S106). Still further, the first processing unit 210 sets the navigation route r(k) on the basis of the navigation map information stored in the navigation map storing unit 204 of the navigation device 200 and the road traffic information delivered from the navigation server 100 to the navigation device 200, and according to the first algorithm, and outputs the same via the output device 202 (FIG. 2/S108). For example, as is shown in FIG. 3(a), the route connecting the current position $p_1$ and the destination position $p_2$ of the automobile 2 is set as the navigation route r(k). In "the first algorithm", the algorithm showing preference to shortening the required moving time or the distance of the automobile 2 to the destination position $p_2$, traveling specific road (general road, toll road, or the like), and passing through a specified point or specified link, and the like may be included. The first algorithm may be fixed as an algorithm inherent to the navigation device 200, or may be specified through the operation of the input device 201 of the navigation device 200 by the user.

Further, the first processing unit 210 determines whether or not the current position $p_1$ of the automobile 2 is on the latest navigation route r(k) (or the support route R(k) described later) or on the navigation route r(k) (or the support route R(k)) output via the output device 202 (FIG. 2/S110).

When it is determined that the current position $p_1$ of the automobile 2 is on the latest navigation route r(k) or the like (FIG. 2/S110 . . . YES), it is further determined whether or not the current position $p_1$ of the automobile 2 is in a vicinity region $S_2(p_2)$ of the destination position $p_2$ (FIG. 2/S112). When it is determined that the current position $p_1$ of the automobile 2 is outside the vicinity region $S_2(p_2)$ of the destination position $p_2$ (FIG. 2/S112 . . . NO), the first processing unit 210 successively measures the current position $p_1$ of the automobile 2, and determines whether or not the current position $p_1$ of the automobile 2 is on the latest navigation route r(k) or the like (FIG. 2/S102, S110).

Further, when it is determined that the current position $p_1$ of the automobile 2 departs from the latest navigation route r(k)

or the like (FIG. 2/S110 . . . NO), the second processing unit 220 increases the index k by "1" (FIG. 2/S114), and the new navigation route r(k+1) which connects the current position $p_1$ and the destination position $p_2$ of the automobile 2 is newly set and output (FIG. 2/S116). For example, when the automobile 2 travels as is indicated by a broken arrow in FIG. 3(b) and the current position $p_1$ thereof deviates from the k-th navigation route r(k) (dot-and-dash line), the new k+1-th navigation route r(k+1) which connects the current position $p_1$ and the destination position $p_2$ is set, as is shown by continuous double line and solid line in FIG. 3(c). The k+1-th navigation route r(k+1) is set so as to include a connecting route $r_0$(k+1) indicated by the double line which connects the current position $p_1$ of the automobile 2, and a position $p_0$ of the k-th navigation route r(k) outside of a predetermined range $S_1(p_1)$ which takes the current position $p_1$ as reference.

Further, the second processing unit 220 executes a route request to the navigation server 100 (FIG. 2/S118). By doing so, the navigation route r(k) newly set, more specifically the link identifier of individual link constituting the navigation route r(k), is transmitted or uploaded from the navigation device 200 to the navigation server 100 together with a navigation identifier for identifying the navigation device 200. Here, of the navigation route r(k+1) newly set, only the link identifier of individual link constituting the connecting route $r_0$(k+1) (refer to FIG. 3(c)) may be transmitted from the navigation device 200 to the navigation server 100.

In the navigation server 100, the first support processing unit 110 recognizes the navigation route r(k), more specifically the link identifier of individual link constituting the navigation route r(k), which is associated with the navigation identifier, and a starting point and a terminal point of the navigation route r(k) are recognized as the current position $p_1$ and the destination position $p_2$ of the automobile 2, respectively (FIG. 2/S202).

Further, the second support processing unit 120 sets the support route R(k) which connects the current position $p_1$ and the destination position $p_2$ of the automobile 2 on the basis of the first road traffic information stored in the first road traffic information storing unit 101, the second road traffic information stored in the second road traffic information storing unit 102, the weather information and the like stored in the weather condition storing unit 103, and the support map information stored in the support map storing unit 104, and according to the second algorithm (FIG. 2/S204). By doing so, the support route R(k+1) (solid line) different from the navigation route r(k+1) (dot-and-dash line) is set, for example as shown in FIG. 3(d). In the "second algorithm", an algorithm showing preference to shortening the required moving time or the distance of the automobile 2, lowering the usage fee, improving the fuel consumption, and passing through a specified point or specified link, and the like may be included. The second algorithm may be specified by the user through the navigation device 200 or a personal computer, and may be transmitted or uploaded to the navigation server 100 from the personal computer and the like. The second algorithm may be previously set so as not to overlap with the first algorithm. Further, an algorithm identifier showing the type of the first algorithm may be transmitted from the navigation device 200 to the navigation server 100, and the second support processing unit 120 may select the second algorithm so as not to overlap with the first algorithm on the basis of the information.

Here, it may be configured so that information indicating the version of the navigation map information is transmitted or uploaded from the navigation device 200 to the navigation server 100, the support map information of the version matching with the version of the navigation map information is selected at the navigation server 100 according to the information, and the support route R(k) may be set on the basis of the selected support map information.

Further, the third support processing unit 130 evaluates the first index $c_1(k)$ and a second index $c_2(k)$ that represent the adequacy of the navigation route r(k) and the support route R(k) in view of the second algorithm, respectively (FIG. 2/S206). For example, in the case where the second algorithm is an algorithm showing preference to shortening the moving time, decreasing functions of the moving time for each of the case where the automobile 2 moves according to the navigation route r(k) and the support route R(k) to the destination position $p_2$ of the automobile 2, respectively, that are predicted on the basis of the latest road traffic information for individual link possessed by the navigation server 100, are evaluated as the first index $c_1(k)$ and the second index $c_2(k)$, respectively. Further, in the case where the second algorithm is an algorithm showing preference to lowering the road usage fee, decreasing functions of the sum of the road usage fee for each of the case where the automobile 2 moves according to the navigation route r(k) and the support route R(k), respectively, that are calculated on the basis of the map information possessed by the navigation server 100, are evaluated as the first index $c_1(k)$ and the second index $c_2(k)$, respectively. Still further, in the case where the second algorithm is an algorithm showing preference to improving fuel consumption, sums of an ecology index representing efficiency of the fuel consumption of the automobile 2 according to the navigation route r(k) and the support route R(k), respectively, that are calculated according to a predetermined table or computation formula on the basis of the road traffic information, are evaluated as the first index $c_1(k)$ and the second index $c_2(k)$, respectively. Still further, in the case where the second algorithm is an algorithm showing preference to passing through a specified point or a specified link, a frequency of appearance or a percentage of inclusion of the specified link or the like in the navigation route r(k) and the support route R(k), respectively, are evaluated as the first index $c_1(k)$ and the second index $c_2(k)$, respectively.

Moreover, the third support processing unit 130 determines whether or not a deviation of the second index $c_2(k)$ with respect to the first index $c_1(k)$ is smaller than a threshold value c (FIG. 2/S208). Thereafter, in the case where the determination result is positive, a flag f for specifying the output route in the navigation device 200 is set to "1" (FIG. 2/S208 . . . YES, S210), and on the other hand when the determination result is negative, the flag f is set to "2" (FIG. 2/S208 . . . NO, S212). The third support processing unit 130 delivers or downloads the setting flag f to the navigation device 200 identified by the navigation identifier. In the case where the setting flag f is "1", only the flag f is transmitted to the navigation device 200. On the other hand, in the case where the setting flag is "2", link identifier of individual link constituting the support route R(k) is delivered to the navigation device 200, in addition to the flag f.

Subsequently, in the navigation device 200, the second processing unit 220 determines whether the flag f is either "1" or "2" (FIG. 2/S120). In the case where the flag f is "1", the navigation route r(k) is continuously output to the display device (refer to FIG. 3(c)). Also, as is explained above, the first processing unit 210 measures the current position $p_1$ of the automobile 2, and determines whether or not the current position $p_1$ is on the latest navigation route r(k) (FIG. 2/S102, S110).

On the other hand, in the case where the flag f is "2", the support route R(k) is output through the output device 202 in place of the navigation route r(k) (refer to FIG. 2/S122, FIG. 3(d)). Also, as is explained above, the first processing unit 210 measures the current position $p_1$ of the automobile 2, and determines whether or not the current position $p_1$ is on the latest support route R(k) (FIG. 2/S102, S110). Here, other than outputting the support route R(k) delivered from the navigation server 100 as it is at the navigation device 200, the support route R(k) newly searched for in the navigation device 200 on the basis of the support route R(k) (and the road traffic information of individual link) delivered from the navigation server 100 may be output.

Thereafter, when it is determined that the current position $p_1$ of the automobile 2 is inside the vicinity region $S_2(p_2)$ of the destination position $p_2$ (FIG. 2/S112 ... YES), then the series of processes mentioned above including route output and the like is completed.

According to the navigation server 100 exerting the above-mentioned functions, adequacy of the navigation route r(k) and the support route R(k), respectively, in view of the second algorithm is evaluated as the first index $c_1(k)$ and the second index $c_2(k)$, respectively (refer to FIG. 2/S206). Further, on the basis of the comparison result of the first index $c_1(k)$ and the second index $c_2(k)$, it is determined whether or not there is adequacy in the navigation route r(k) (refer to FIG. 2/S208). Then, in accordance with the determination result that the same lacks adequacy, it becomes possible to output the support route R(k) to the navigation device 200 in place of the navigation route r(k) (refer to FIG. 2/S122, FIG. 3(d)). That is, in the case where the navigation route r(k) set at the navigation device 200 lacks adequacy in view of the second algorithm, it becomes possible to make the navigation device 200 output the support route R(k) having adequacy in view of the second algorithm through the output device 202. For example, in the case where the navigation route r(k) lacks adequacy in view of shortening of the moving time or distance, improving of fuel consumption, saving of toll fare, or frequency of passing the specified point or specified link, it becomes possible to make the navigation device 200 output the support route R(k) having shorter moving time or distance, the support route R(k) predicted as having better fuel consumption, the support route R(k) predicted as having lower toll fare, or the support route R(k) having higher frequency of passing the specified point or specified link, in place of the navigation route r(k).

Further, it becomes possible to make the navigation server 100 examine whether or not the navigation route r(k) set according to the first algorithm have adequacy in view of the second algorithm. Thereafter, in accordance with the examination result at the navigation server 100 that the navigation route r(k) lacks adequacy, it becomes possible to recognize the support route R(k), and output the support route R(k) in place of the navigation route r(k).

On the other hand, it becomes possible to make the navigation server 100 examine whether or not the current navigation route r(k+1) set in accordance with the fact that the current position $p_1$ of the automobile 2 departed from the previous navigation route r(k) have adequacy in view of the second algorithm (refer to FIG. 2/S110 ... NO, S114, S115, S118, S202 through S208). Thereafter, in accordance with the examination result at the navigation server 100 that the navigation route r(k) lacks adequacy, it becomes possible to recognize the support route R(k), and output the support route R(k) in place of the navigation route r(k).

Further, the new navigation route r(k+1) including the connecting route $r_0(k+1)$ which connects the current position $p_1$ of the automobile 2 and the position $p_0$ beyond the predetermined range $S_1(p_1)$ which takes the current position $p_1$ of the automobile 2 as reference in the previous navigation route r(k) is set (refer to FIG. 2/S116, FIG. 3(c)). Therefore, it is possible to avoid the case where the current navigation route r(k+1) which makes the automobile 2 join the previous navigation route (k) at a position within the predetermined range $S_1(p_1)$ from the automobile 2 is newly set. As such, it becomes possible to avoid the situation where the automobile 2 is forced to make unnecessary detours or double backs, by weighing heavily on recovering the automobile 2 to the previous navigation route r(k+1) immediately.

In the above-mentioned embodiments, the support route R(k) is set, the second index $c_2(k)$ of the support route R(k) is evaluated, and the route to be output at the navigation device 200 is determined by comparing the second index $c_2(k)$ with the first index $c_1(k)$, at the navigation server 100 (refer to FIG. 2/S202 through S212). As another embodiment, the evaluation of the second index $c_2(k)$ may be omitted, and the route to be output at the navigation device 200 may be determined in accordance with whether or not the first index $c_1(k)$ exceeds a predetermined value.

The invention claimed is:

1. A navigation system configured from a navigation device and a navigation server which supports guiding of a mobile body by a navigation device, on the basis of communication with the navigation device, the navigation server comprising:
  a first support processing unit which recognizes a navigation route for guiding the mobile body to a destination position, which is set according to a first algorithm by the navigation device, on the basis of communication with the navigation device;
  a second support processing unit which recognizes a departure position and the destination position of the mobile body on the basis of communication with the navigation device, and sets a support route for guiding the mobile body from the departure position to the destination position according to a second algorithm showing preference to short required moving time or the distance of the mobile body, good fuel consumption, low toll fare, or passing a specified point or a specified link for the mobile body; and
  a third support processing unit which evaluates a first index representing an adequacy of the navigation route recognized by the first support processing unit in view of the second algorithm, and makes the navigation device output the support route in place of the navigation route on the basis of communication with the navigation device, on condition that the first index satisfies a predetermined condition,
the navigation device comprising:
  a first processing unit which recognizes a departure position and a destination position of the mobile body, and sets and outputs a navigation route for guiding the mobile body from the departure position to the destination position on the basis of the first algorithm; and
  a second processing unit which makes the navigation server recognize the navigation route set by the first processing unit on the basis of communication with the navigation server, and subsequently outputs a support route in place of the navigation route, on condition that the support route set at the navigation server for guiding the mobile body from the departure position to the destination position is recognized,
wherein on condition that a current position of the mobile body departs from the navigation route or the support route being output, the first processing unit newly sets and outputs the navigation route taking the current position as a new departure position, and the second processing unit makes the navigation server recognize the navigation route newly set by the first processing unit on the basis of communication with the navigation server, and subsequently outputs the support route in place of the navigation route, on condition that the support route newly set at the navigation server for guiding the mobile body from the new departure position to the destination position is recognized.

2. The navigation system according to claim 1,
wherein the third support processing unit evaluates a second index representing an adequacy of the support route set by the second support processing unit in view of the second algorithm, and makes the navigation device output the support route in place of the navigation route on the basis of communication with the navigation device, on condition that the first index satisfies the predetermined condition, the predetermined condition being a condition in which a deviation between the first index and the second index exceeds a threshold value.

3. The navigation system according to claim 1,
wherein the second support processing unit sets the support route according to the second algorithm which differs from the first algorithm.

4. The navigation system according to claim 1,
wherein on condition that the current position of the mobile body departs from the navigation route or the support route being output;
the first processing unit sets a new navigation route including a route which connects the current position of the mobile body and a position of the navigation route exceeding a predetermined range which takes the position of the mobile body as reference.

* * * * *